(12) United States Patent
Files et al.

(10) Patent No.: US 11,019,505 B1
(45) Date of Patent: May 25, 2021

(54) SYSTEM AND METHOD FOR BEAMSTEERING ACQUISITION AND OPTIMIZATION USING TRIANGULATION

(71) Applicant: Dell Products, LP, Round Rock, TX (US)

(72) Inventors: Jace W. Files, Round Rock, TX (US); Liam B. Quinn, Austin, TX (US); Abu S. Sanaullah, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/779,344

(22) Filed: Jan. 31, 2020

(51) Int. Cl.
*H04W 16/28* (2009.01)
*H04W 4/029* (2018.01)
*H04W 4/02* (2018.01)

(52) U.S. Cl.
CPC .......... *H04W 16/28* (2013.01); *H04W 4/023* (2013.01); *H04W 4/029* (2018.02)

(58) Field of Classification Search
CPC ..... H04W 16/28; H04W 4/029; H04W 4/023; H04W 24/10; H04W 64/006; H04W 24/08; H04W 64/00; H04B 7/02
See application file for complete search history.

(56) References Cited

U.S. PATENT DOCUMENTS 9,930,558 B2 * 3/2018 Sahin ..................... H04W 16/14
10,856,110 B1 * 12/2020 Files ...................... G01S 5/0268
(Continued)

FOREIGN PATENT DOCUMENTS

WO 2017/106875 A1 6/2017
WO 2018/075168 A1 4/2018
WO 2018075151 A1 4/2018

*Primary Examiner* — Khawar Iqbal
(74) *Attorney, Agent, or Firm* — Prol Intellectual Property Law, PLLC; H. Kenneth Prol

(57) ABSTRACT

An information handling system, may include a processor. a memory; a wireless adapter to determine whether a millimeter-wave (mm-wave) connection is established between the information handling system and a 5G access point; a triangulation module to, when the wireless adapter determines no mm-wave connection between the information handling system and the 5G access point: determine the location of the information handling system using a triangulation process initiated within a mesh network having a plurality of nodes; calculate angle data descriptive of an angle of the information handling system relative to the 5G access point based on triangulation data obtained during the triangulation process; calculate distance data descriptive of a distance of the information handling system from 5G access point based on the triangulation data; and calculate orientation data descriptive of the orientation of the information handling system based on sensor data obtained from an orientation sensor of the information handling system; and a beamsteering module to: conduct beamsweeping of a plurality of angles for a mm-wave antenna array using the angle data as an initial seed angle for the beamsweeping; determine a selected beamsteering pattern from the information handling system to the 5G access point to initiate the mm-wave communication with the 5G access point based on signal quality above a threshold level; and determine that the information handling system is within range of the 5G access point to enable the mm-wave connection between the information handling system and 5G access point using the selected beamsteering pattern.

20 Claims, 6 Drawing Sheets

(56) References Cited

U.S. PATENT DOCUMENTS

| | | | |
|---|---|---|---|
| 10,856,253 B1* | 12/2020 | Files | H04B 10/1129 |
| 2015/0215798 A1* | 7/2015 | Choi | H04W 24/08 |
| | | | 455/424 |
| 2017/0202029 A1* | 7/2017 | Qi | H04W 72/085 |
| 2019/0074942 A1* | 3/2019 | Moshfeghi | H04L 5/0032 |
| 2019/0079176 A1* | 3/2019 | Weissman | G01S 3/18 |
| 2019/0082332 A1* | 3/2019 | Raghavan | H04B 7/0695 |
| 2019/0200339 A1* | 6/2019 | Handle | G01S 5/0273 |
| 2019/0257921 A1 | 8/2019 | Smits | |
| 2019/0281574 A1 | 9/2019 | Reial | |
| 2020/0084641 A1* | 3/2020 | Henry | H04W 16/28 |
| 2020/0107288 A1* | 4/2020 | Kumar | H04W 64/00 |
| 2020/0119780 A1* | 4/2020 | Klemmer | H04B 7/0602 |
| 2020/0145977 A1* | 5/2020 | Kumar | H04W 72/046 |
| 2020/0229206 A1* | 7/2020 | Badic | H04W 40/24 |

\* cited by examiner

SYSTEM AND METHOD FOR BEAMSTEERING ACQUISITION AND OPTIMIZATION USING TRIANGULATION

FIELD OF THE DISCLOSURE

The present disclosure generally relates to information handling systems and more specifically relates to information handling systems that communicate with a 5G access point using beamsteering acquisition.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may conduct one or more forms of wireless network communication.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
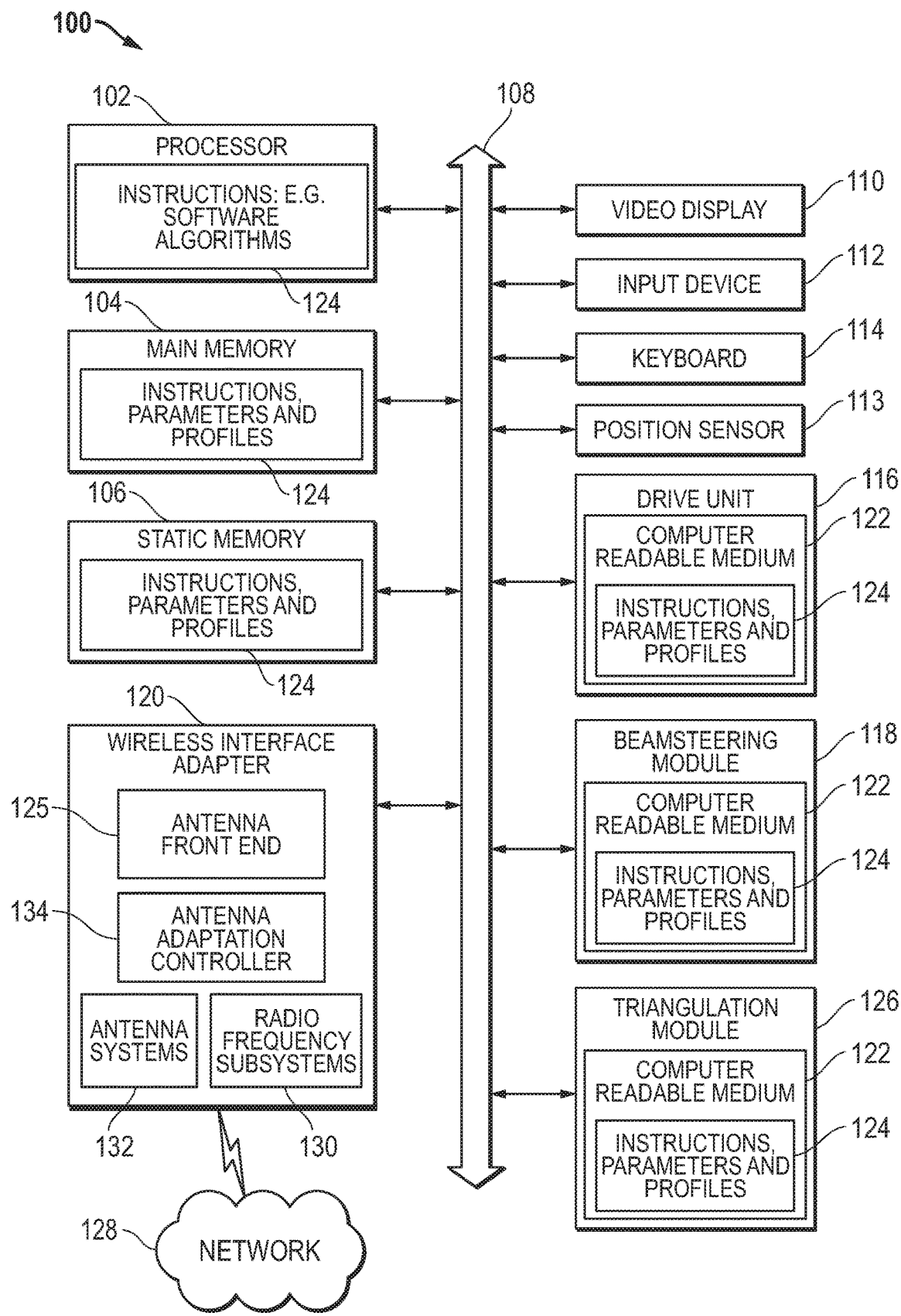
FIG. 1 is a block diagram illustrating an information handling system with millimeter-wave wireless capability according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for an information handling system that includes a processor, one or more controllers, memory, and a wireless adapter to determine whether a millimeter-wave (mm-wave) connection is established between the information handling system and a 5G access point. Upon execution of a triangulation module when the wireless adapter determines no mm-wave connection has been established between the information handling system and the 5G access point, the triangulation module may determine the location of the information handling system using a triangulation process initiated within a mesh network having a plurality of nodes which may be nodes of a variety of wireless protocols including LTE, Wi-Fi, or Bluetooth. The process may utilize a mesh network of such nodes in some embodiments. In other embodiments, GPS system may be available, such as outdoors, to determine location or position of an endpoint information handling system relative to one or more 5G access points. The triangulation module may utilize the triangulation process to determine location of an endpoint information handling system relative to one or more available 5G access points at known locations to calculate angle data descriptive of an angle of the information handling system relative to a 5G access point based on triangulation data obtained during the triangulation process. The triangulation module may further calculate distance data descriptive of a distance of the information handling system from 5G access point based on the triangulation data. Additionally, the triangulation module may calculate orientation data descriptive of the orientation of the information handling system and orientation of 5G mm-wave antenna arrays deployed thereon based on sensor data obtained from an orientation sensor of the information handling system to refine angle data and position data. The information handling system may further execute a beamsteering module with the processor to conduct beamsweeping of a plurality of angles for a mm-wave antenna array using the angle data as an initial seed angle for the beamsweeping. The beamsteering module may determine that the information handling system is within range of one or more 5G access points and also determine a selected beamsteering pattern from the information handling system to the 5G access point to initiate the mm-wave communication with the 5G access point based on signal quality above a threshold level. This process may be used to enable the mm-wave connection between the information handling system and 5G access point using the selected beamsteering pattern.

In addition, the information handling system may further send the distance data and angle data to the 5G access point to allow the 5G access point to steer the 5G access point beamsteering pattern toward the information handling system during beamsweeping for conducting measurements during beamsweeping of signal quality levels between the endpoint information handling system and the 5G access point. The 5G access point may be provided angular data to conduct steering of its own mm-wave antenna array during beamsweeping.

In another embodiment, the information handling system sends the selected beamsteering pattern to the 5G access point to allow the 5G access point to select a reciprocal beamsteering pattern from the 5G access point to the information handling system for mm-wave communication between the 5G access point and the information handling system.

In addition, in some embodiments, when the wireless adapter determines a mm-wave connection has been established between the information handling system and the 5G access point, the wireless adapter iteratively determines whether the information handling system is moving or whether a signal quality of the mm-wave connection has degraded below a second threshold level; and where it is determined that either the information handling system is moving or the signal quality of the mm-wave connection has degraded below the second threshold, the triangulation recalculates angle data descriptive of the angle of the information handling system relative to the 5G access point and recalculates distance data descriptive of the distance of the information handling system from the 5G access point. In this embodiment, the beamsteering module may receive the recalculated angle data and recalculated distance data from the triangulation module and select an adjusted beamsteering pattern from the information handling system to the 5G access point to continue the mm-wave communication with the 5G access point.

In an embodiment, the triangulation process initiated within a mesh network is a Wi-Fi triangulation process. In this embodiment, a Wi-Fi signal may be used determine the location of the information handling system using a triangulation process initiated within a mesh network having a plurality of nodes; calculate angle data descriptive of an angle of the information handling system relative to the 5G access point based on triangulation data obtained during the triangulation process; and calculate distance data descriptive of a distance of the information handling system from 5G access point based on the triangulation data.

Although specific wireless communication protocols are described in connection with the use of the triangulation module at the information handling system, the present specification contemplates that, for triangulation purposes, any type of wireless communication protocol may be used. These different types of wireless communication protocols may implement a variety of radio frequency (RF) bands that allow an antenna or array of antennas on the information handling system to receive and transmit RF signals so that data may be transmitted across to, in an embodiment, a mesh network of devices within an area.

FIG. 1 illustrates an information handling system 100 similar to information handling systems millimeter-wave wireless capability according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, a communications device, an 5G access point (AP), a base station transceiver, a wireless telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. Further, the information handling system may serve as a node or may utilize a mesh network, such as mesh wireless network according to embodiments herein. In further embodiments, a 5G access point of embodiments herein may be a type of information handling system with some shared or subset of components as described with respect to FIG. 1. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include a memory (volatile (e.g. random-access memory, etc.), non-volatile (read-only memory, flash memory etc.) or any combination thereof), one or more processing resources, such as a central processing unit (CPU), the processor 102 illustrated in FIG. 1, a graphics processing unit (GPU), hardware or software control logic, or any combination thereof. Additional components of the information handling system 100 may include one or more storage devices, one or more communications ports for communicating with external devices, as well as, various input and output (I/O) devices, such as a keyboard 114, a mouse, a video/graphic display 110, or any combination thereof. The information handling system 100 may also include one or more buses operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may be a mobile information handling system seeking to establish a 5G mm-wave connection with a 5G access point in one embodiment. In another embodiment, the information handling system 100 may operate as a 5G access point to provide for mm-wave connection. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, computer readable medium 122 storing instructions 124 of the beamsteering module 118 and triangulation module 126, and drive unit 116 (volatile (e.g. random-access memory, etc.), nonvolatile (read-only memory, flash memory etc.) or any combination thereof). The information handling system 100 may also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, or gesture or touch screen input), and a keyboard 114. The information handling system 100 may also include a disk drive unit 116.

Further components of the information handling system 100 for use with embodiments herein may include positional sensors 113 such as location sensors, movement sensors, or orientation sensors as described in various embodiments herein. Positional sensors 113 may be any of gyroscope, an accelerometer, a global positioning satellite (GPS) sensor, magnetometer, orientation sensor, a tilt sensor, Hall sensors, or the like that may be used to detect angle of an information handling system, motion, and position of portions, such as a display chassis with respect to a base chassis, in various configurations. For example, the system may determine various configurations of a convertible laptop information handling system as a display chassis is opened to a variety of angles with respect to a base chassis. Positional sensors 113 may further include components for use with embodiments herein on the information handling system 100 include one or more light sensors that may be any form of light sensor including camera systems for detection of location, proximity or ambient light that may indicate position and orientation of a display chassis with respect to a display chassis.

The network interface device shown as wireless interface adapter 120 may provide connectivity to a network 128, e.g., a wide area network (WAN), a local area network (LAN), wireless local area network (WLAN), a wireless personal area network (WPAN), a wireless wide area network (WWAN), a mesh network, or other networks. Connectivity may be via wired or wireless connection. The wireless interface adapter 120 may operate in accordance with any wireless data communication standards. Wireless interface adapter 120 may include an antenna front end circuitry for receiving and transmitting signals, selecting channels, modulation/demodulation activity, and the like. Wireless interface adapter 120 may further include one or more antenna systems 132 and radio frequency subsystems to support one or more wireless communication standards as outlined and discussed with reference to embodiments herein. In an embodiment, these wireless communication standards may include those wireless communication standards associated with Wi-Fi communications, Bluetooth® (BT) communications, and 4G and 5G wireless communications, among others. Further, as described further below, antenna system 132 may include antenna array systems to provide multiple available wireless channels as well as selection of directionality of wireless electromagnetic radiation nodes according to embodiments described herein such as relating to beamsteering. Additionally, wireless interface adapter 120 may include one or more controllers such as antenna adaptation controller 134 to support beamsteering functions, channel selection, and, in some embodiments, selection among one or more wireless protocols. As described in embodiments herein, the one or more controllers including antenna adaptation controller 134 may implement some or all of the triangulation module 126 or some or all of a beamsteering module 118.

To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links. Further, connectivity of the information handling system 100 to, for example, a 5G access point, may be available using any protocols related to a 5G new radio (NR) standard or similar standards as described herein.

Wireless adapter 120, in an embodiment, may connect to any combination of macro-cellular wireless connections including 2G, 2.5G, 3G, 4G, 5G or the like from one or more service providers. Utilization of radiofrequency communication bands according to several example embodiments of the present disclosure may include bands used with the BT standards, the WLAN standards, WWAN standards, and 5G NR standards which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN and BT, for example, may also operate at a 2.4 GHz band or 2.45 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well.

Wireless adapter 120, in an embodiment, may connect to any 5G access point using a plurality of radio frequency (RF) bands that include both those RF bands associated with Wi-Fi communications, BT communications, LTE communications, and those RF waves associated with 5G NR communications. In an embodiment, the wireless interface adapter 120 may be communicatively coupled to an array of antennas used to communicate with 5G access point. In an embodiment, the antenna array may communicatively couple the information handling system with an 5G access point using a 5G NR connection. The wireless interface adapter 120 may also be operatively coupled to an array of antennas that emit RF waves higher than 6 GHz herein referred to a millimeter-wave (mm-wave) antennas. The mm-wave antennas may support a 5G wireless communication protocol so that relatively higher amounts of data may be transmitted between the information handling system 100 and any 5G access point of a network. In an embodiment, the wireless interface adapter 120 may be communicatively coupled to an array of antennas used to communicate with any nodes within a mesh network. In an embodiment, these nodes may include any bridges, switches, or other infrastructure devices that allow the triangulation module 126 of the information handling system 100 to receive or send transmission to triangulate the position of the information handling system 100 within an area or space.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 may communicate voice, video or data over the network 128. Further, the instructions 124 may be transmitted or received over the network 128 via the network interface device or wireless adapter 120.

The information handling system 100 may include a set of instructions 124 that may be executed to cause the computer system to perform any one or more of the methods or computer-based functions disclosed herein. For example, instructions 124 may execute a beamsteering module 118, a triangulation module 126, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs. The beamsteering module 118 and triangulation module 126 may operate as executable instructions on one or more controllers such as antenna adaptation controller 134 or as part of an antenna front end 125 within wireless adapter 120 in some embodiments. Some portions of beamsteering module 118 and triangulation module 126 may operate also operate as code instructions 124 via processor 102 in some embodiments.

The disk drive unit 116, the triangulation module 126, and the beamsteering module 118 may include a computer-readable medium 122 in which one or more sets of instructions 124 such as software may be embedded. Similarly, main memory 104 and static memory 106 may also contain a computer-readable medium for storage of one or more sets of instructions, parameters, or profiles 124 including an estimated training duration table. The disk drive unit 116 and static memory 106 may also contain space for data storage. Further, the instructions 124 may embody one or more of the methods or logic as described herein. For example, instructions relating to the triangulation module 126 and beamsteering module 118 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 or one or more controllers of information handling system 100. As explained, some or all of the triangulation module 126 and beamsteering module 118 may be executed locally or remotely. The main memory 104 and the processor 102, or one or more controllers also may include or access computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The triangulation module 126 and beamsteering module 118 may be stored in static memory 106 such as at a controller 134, or the drive unit 116 on a computer-readable medium 122 such as a flash memory or magnetic disk in an example embodiment. While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the triangulation module 126 that may be operably connected to the bus 108. The computer readable medium 122 of the triangulation module 126 may also contain space for data storage. The triangulation module 126 may, according to the present description, perform tasks related to determining the location of the information handling system using a triangulation process initiated within a mesh network having a plurality of nodes which may form a mesh network according to any wireless protocol. In example embodiment, LTE, Wi-Fi, or GPS systems may be used for determination of locations. The triangulation module 126 may then calculate angle data descriptive of an angle of the information handling system relative to the 5G access point based on triangulation data obtained during the triangulation process. The triangulation module 126 may also calculate distance data descriptive of a distance of the information handling system from 5G access point based on the triangulation data. The triangulation module 126 may further calculate orientation data descriptive of the orientation of the information handling system based on sensor data obtained from one or more orientation sensor 113 of the information handling system to refine angle calculations with respect to the information handling system in some embodiments, and with respect to the planar orientation of a 5G mm-wave antenna array in some embodiments where the information handling system is reconfigurable. In some embodiments, the triangulation module 126 may obtain data descriptive of the location of the information handling system relative to any node within a mesh network to aid the information handling system 100 to initiate a mm-wave antenna on a 5G access point. The connection of the information handling system 100 with the nodes within the mesh network may provide that angle data, distance data, and orientation to the information handling system 100 and, in some embodiments, the 5G access point. The provision of this data is done so that a mm-wave communication can be established with the 5G access point via the modification of a main lobe of RF electromagnetic (EM) waves by the beamsteering module 118.

In an embodiment, the triangulation module 126 may communicate with the main memory 104, the processor 102, the video display 110, the alpha-numeric input device 112, and the wireless adapter 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100. In one aspect, the triangulation module 126 may operate wholly or partially on a controller such as 134 or another controller within the wireless adapter 120.

The information handling system 100 may also include the beamsteering module 118 that may be operably connected to the bus 108. The computer readable medium 122 of the beamsteering module 118 may also contain space for data storage. The beamsteering module 118 may, according to the present description, perform tasks related to conducting beamsweeping at a plurality of angles for a mm-wave antenna array using the angle data of the endpoint information handling system and one or more 5G access points received from location and position determinations via triangulation, mesh networking estimations, or GPS as described herein. The angle data may be used as an initial seed angle for the beamsweeping, determining a selected beamsteering pattern from the information handling system to the 5G access point to initiate the mm-wave communication with the 5G access point based on signal quality above a threshold level, and determining that the information handling system is within range of the 5G access point to enable the mm-wave connection between the information handling system and 5G access point using the selected beamsteering pattern. In some embodiments, the beamsteering module 118 may further send the selected beamsteering pattern to the 5G access point to allow the 5G access point to select a reciprocal beamsteering pattern from the 5G access point to the information handling system for mm-wave communication between the 5G access point and the information handling system.

In an embodiment, the beamsteering module 118 may communicate with the main memory 104, the processor 102, the video display 110, the alpha-numeric input device 112, and the wireless adapter device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100. In one aspect, the beamsteering module 118 may operate wholly or partially on a controller such as 134 or another controller within the wireless adapter 120.

In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
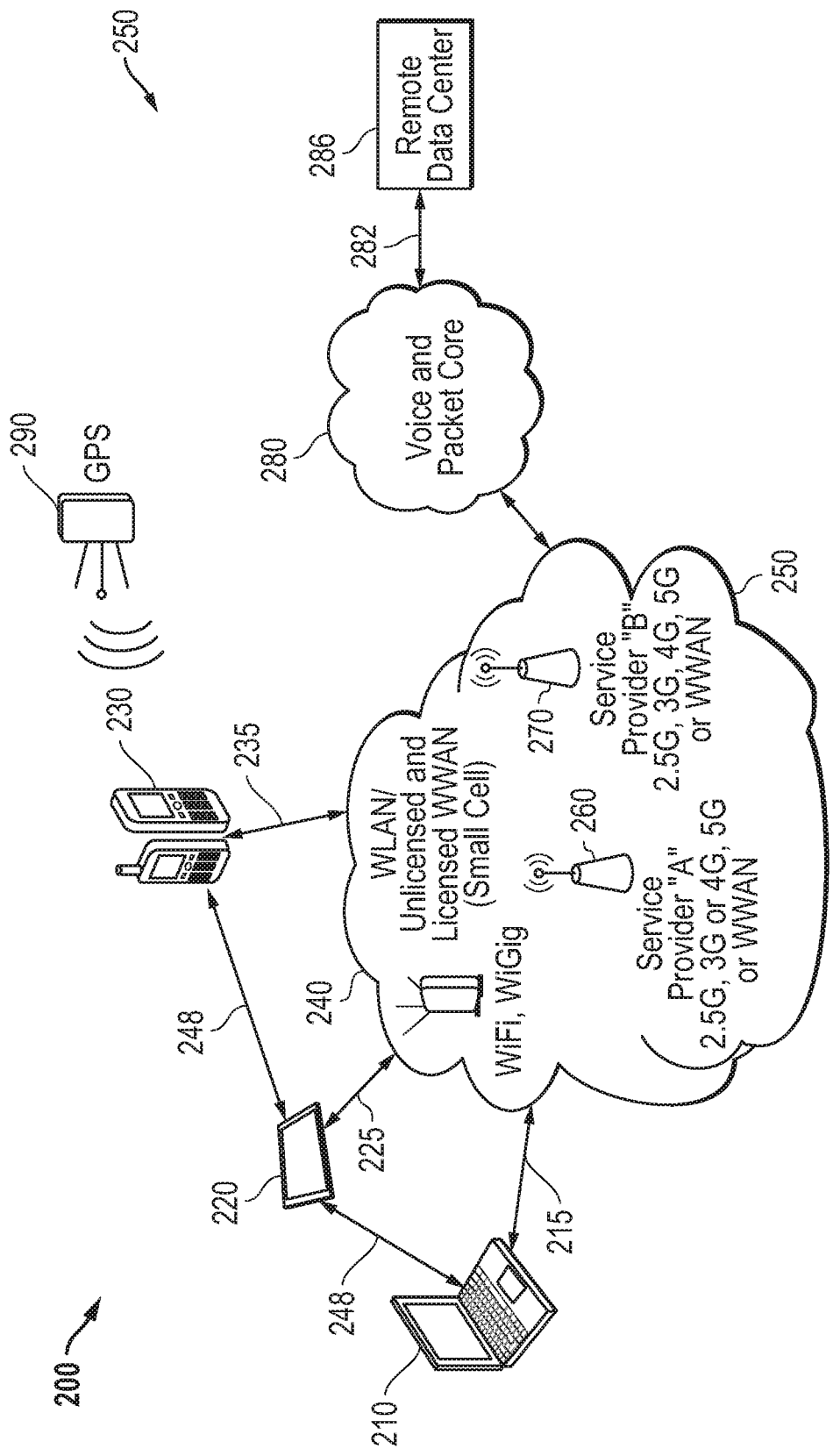
FIG. 2 is a block diagram of a network environment offering several communication protocol options and mobile information handling systems according to an embodiment of the present disclosure.

FIG. 2 is a block diagram of a network environment 200 offering several communication protocol options and mobile information handling systems according to an embodiment of the present disclosure. FIG. 2 illustrates a network 200 that can include one or more information handling systems 210, 220, 230 that may include the information handling system described in connection with FIG. 1. In a particular embodiment, network 200 includes networked mobile information handling systems 210, 220, and 230, 5G wireless access points, and multiple wireless connection link options. A variety of additional computing resources of network 200 may include client mobile information handling systems, data processing servers, network storage devices, local and wide area networks, or other resources as needed or desired. As partially depicted, systems 210, 220, and 230 may be a laptop computer, tablet computer, 360-degree convertible systems, wearable computing devices, a smart phone device or other computing devices. These mobile information handling systems 210, 220, and 230, may access a wireless local network 240, or they may access a macro-cellular network 250 via the 5G access points. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option. Mesh networking components may include Wi-Fi mesh networks, LTE mesh networks such as 3G, 4G or even 5G networks, as well as future mesh technologies such as Bluetooth, Zigbee, internet or things (IOT) wireless networking technologies, or the via other wireless networks available.

Components of a wireless local network may be connected by wireline or Ethernet connections to a wider external network. For example, wireless 5G access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, or 5G small cell WWAN communications such as eNodeB, IEEE 802.11, IEEE 1914/1904, IEEE P2413/1471/42010, or similar wireless network protocols developed for 5G communications. In an embodiment, the networked mobile information handling systems 210, 220, and 230 may communicate via any 5G protocol used to transmit mm-wave frequencies.

Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or 5G standards including WiMAX, LTE, and LTE Advanced, LTE-LAA, small cell WWAN, and the like. Wireless local network 240 and macro-cellular network 250 may include a variety of licensed, unlicensed or shared communication frequency bands as well as a variety of wireless protocol technologies ranging from those operating in macrocells, small cells, picocells, or femtocells. Further, networked mobile information handling system 210, 220, or 230 may have access to global positioning system (GPS) transmitter 290 for determination of position of the endpoint device in some embodiments.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple antenna systems to enhance wireless data bandwidth. Similarly, a single antenna or plural antennas may be used on each of the wireless communication devices so that the beamforming processes may be engaged in as described herein. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Gig ISM frequency bands that could be subject to sharing include 2.4 GHz, 5 GHz and 60 GHz bands or similar bands as understood by those of skill in the art. For embodiments herein, 5G NR frequency bands such as FR1 (e.g., n1-n3, n5, n7, n8, n12, n14, n18, n20, n25, n28-n30, n34, n38-n41, n48, n50, n51, n65, n66, n70, n71, n74-n84, n86, n89, and n90) and FR2 (e.g., n257, n258, n260, and n261) bands may be transceived at the antenna or antennas at the information handling system 210, 220, or 230. Within local portion of wireless network 250 access points for Wi-Fi or WiGig as well as small cell WWAN connectivity may be available in emerging 5G technology. This may create situations where a plurality of antenna systems are operating on a mobile information handling system 210, 220 or 230 via concurrent communication wireless links on both WLAN and WWAN or multiple concurrent wireless link to enhance bandwidth under a protocol and which may operate within the same, adjacent, or otherwise interfering communication frequency bands. The antenna or the individual antennas of an antenna array may be transmitting antennas that includes high-band, medium-band, low-band, and unlicensed band transmitting antennas. Alternatively, embodiments may include a single transceiving antennas capable of receiving and transmitting, and/or more than one transceiving antennas.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, or other network structure. Such a connection 282 may be made via an access point/Ethernet switch to the external network and be a backhaul connection. The access point may be connected to one or more wireless access points before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices.

Although 215, 225, and 235 are shown connecting wireless adapters of mobile information handling systems 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as a 5G access point or even potentially a WWAN connection via small cell communication on licensed or unlicensed WWAN connections. Concurrent wireless links to information handling systems 210, 220, and 230 may be connected via any access points including other mobile information handling systems as illustrated in FIG. 2.

In an embodiment, the information handling system 210, 220, or 230 may be communicatively coupled to a mesh network 250. In this embodiment, the mesh network 250 may include any local network topology that includes a plurality of nodes with which the information handling system 210, 220, or 230 may communicate. In an embodiment, the mesh network 250 may be in the form of a mesh network 250 that includes a number of LTE band nodes used, for example, in tracking the information handling system 210, 220, or 230 throughout an area. In this embodiment, the LTE band nodes may obtain several pieces of data related to the location and orientation of the information handling system 210, 220, or 230 within this space. A first piece of data may include distance data descriptive of the distance the information handling system 210, 220, or 230 from any or a plurality of LTE band nodes. This distance data may be obtained by measuring, at the information handling system 210, 220, or 230, a signal strength from any identifiable LTE band node communicatively accessible by the information handling system 210, 220, or 230. As second piece of data may include angle data descriptive of the angle of the information handling system 210, 220, or 230 relative to any or a plurality of antennas associated with the LTE band nodes. These LTE band nodes may each include a plurality of antenna that sends and receives signals from the information handling system 210, 220, or 230. By measuring, for example, a time of flight (TOF) at each of these plurality of antennas, the information handling system 210, 220, or 230 may receive such angle data from the plurality of LTE band nodes descriptive of the angle of the information handling system 210, 220, or 230 relative to each of these LTE band nodes. A third piece of data may include the location of the LTE band nodes within the LTE mesh network 250. This data allows the information handling system 210, 220, or 230 to know the absolute location of each of the LTE band nodes within a physical space the LTE mesh network 250 is formed within. Through calculating the distance data, angle data, and LTE band node location data, from a plurality of LTE band nodes, the position of the information handling system 210, 220, or 230 within the space occupied by the LTE mesh network 250 may be triangulated.

In an embodiment, the mesh network 250 may be a Wi-Fi mesh network 250 that includes any local network topology made of a plurality of nodes with which the information handling system 210, 220, or 230 may communicate. In an embodiment, the Wi-Fi mesh network 250 may be in the form of a mesh network 250 that includes a number of Wi-Fi band nodes used, for example, in tracking the information handling system 210, 220, or 230 throughout an area. In this embodiment, the Wi-Fi band nodes may obtain several pieces of data related to the location and orientation of the information handling system 210, 220, or 230 within this space. A first piece of data may include distance data descriptive of the distance the information handling system 210, 220, or 230 from any or a plurality of Wi-Fi band nodes. This distance data may be obtained by measuring, at the information handling system 210, 220, or 230, a signal strength from any identifiable Wi-Fi band node communicatively accessible by the information handling system 210, 220, or 230. As second piece of data may include angle data descriptive of the angle of the information handling system 210, 220, or 230 relative to any or a plurality of antennas associated with the Wi-Fi band nodes. These Wi-Fi band nodes may each include a plurality of antenna that sends and receives signals from the information handling system 210, 220, or 230. By measuring, for example, a time of flight (TOF) at each of these plurality of antennas, the information handling system 210, 220, or 230 may receive such angle data from the plurality of Wi-Fi band nodes descriptive of the angle of the information handling system 210, 220, or 230 relative to each of these LTE band nodes. A third piece of data may include the location of the Wi-Fi band nodes within the Wi-Fi mesh network 250. This data allows the information handling system 210, 220, or 230 to know the absolute location of each of the Wi-Fi band nodes within a physical space the Wi-Fi mesh network 250 is formed within. Through calculating the distance data, angle data, and Wi-Fi band node location data, from a plurality of Wi-Fi band nodes, the position of the information handling system 210, 220, or 230 within the space occupied by the Wi-Fi mesh network 250 may be triangulated.

In yet other embodiments, a GPS system with connectivity to GPS nodes 390 may be used for location and position identification for an endpoint information handling system enable with such capability. Further, GPS nodes 390 may also track locations or have known locations for one or more 5G access points to determine relative location of the endpoint information handling system relative to the one or more 5G access points. With such position data determined from a GPS system angular or distance data may be determined. In some embodiments as described, this angular and position data may utilize refining of angular and position data by use of position sensors as described. Further, in some embodiments, GPS system information may be available only in outside environments.

Figure 3:
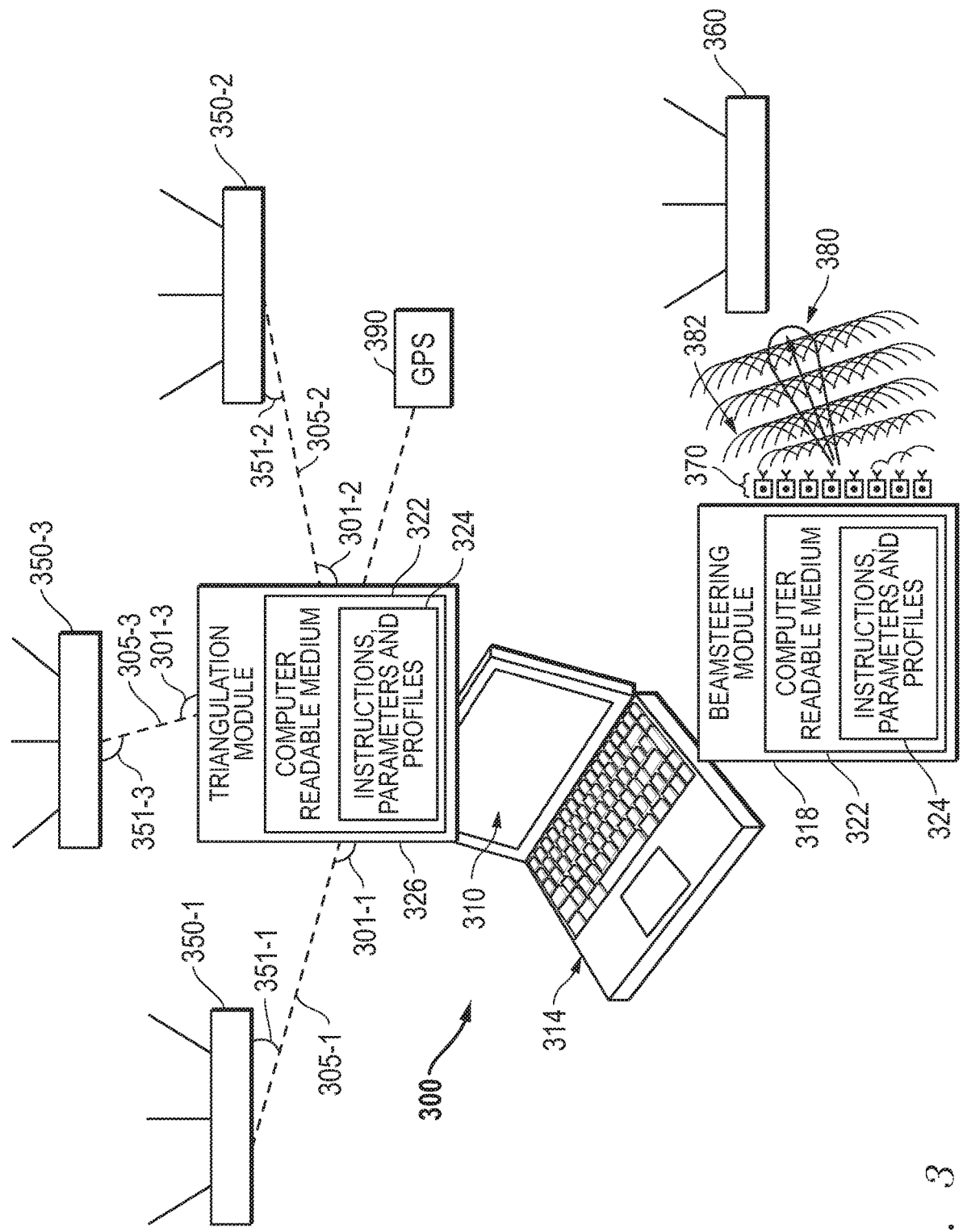
FIG. 3 is a block diagram illustrating an information handling system with millimeter-wave wireless capability according to an embodiment of the present disclosure.

FIG. 3 is a block diagram illustrating an information handling system 300 with millimeter-wave wireless capability according to an embodiment of the present disclosure. The information handling system 300 may be any type of device that computes, classifies, processes, transmits, receives, retrieves, originates, switches, stores, displays, manifests, detects, records, reproduces, handles, or uses any form of information, intelligence, or data for business, scientific, control, entertainment, or other purposes. In the example shown in FIG. 3, the information handling system 300 is a laptop device that includes a screen portion 310 including a screen to present visual data to a user. The information handling system 300 may also include a keyboard portion 314 that includes a number of actuatable keys that allows a user to provide input to the information handling system 300. Via interaction with the keyboard portion 314 by a user, the user may input data into the information handling system 300 and receive output from the screen portion 310. In the embodiments described herein, the information handling system 300 may include one or more antenna system locations where Wi-Fi, LTE, and 5G NR-associated RF waves may be emitted as described herein. Any number of antenna systems may be present and the present specification contemplates that these antenna arrays may emit any RF as described herein to provide communication to the mesh networks and 5G access points as described. Although FIG. 3 shows the information handling system 300 as a laptop computing device, the present description contemplates that any type of computing device and/or combination of computing devices may be used to execute the processes and methods described herein. FIG. 3 also shows a plurality of nodes 350-1, 350-2 and 350-3 for wireless triangulation of the information handling system 300 during operation so that the beamsteering module 318 may operate an array of mm-wave antennas 370 to adjust a main lobe 380 of the RF pattern emitted therefrom. These will be discussed in more detail.

The information handling system 300 may include a triangulation module 126. The triangulation module 126 may be executed at a controller in a wireless adapter, at a processor, or some combination in embodiments herein. As described herein, the triangulation module 126 may establish a connection with the any number of nodes 350-1, 350-2 and 350-3 of a mesh network. The nodes 350-1, 350-2 and 350-3 may be any device that may communicate amongst each other in order to provide, to the information handling system 300, data descriptive of the location of the information handling system 300 relative to one or more 5G access points 360. The triangulation module 126 may accomplish this by, for example, receiving data descriptive of a detected signal strength between the information handling system 300 and the individual nodes 350-1, 350-2 and 350-3. This signal strength data may be used to triangulate the location of the information handling system 300 within the area that the nodes 350-1, 350-2 and 350-3 of the mesh node network are deployed within. In an embodiment, the nodes 350-1, 350-2 and 350-3 may each be an LTE cell tower that detects the signal strength and angle of the RF signals from the information handling system 300 to determine where the information handling system 300 is located. In this embodiment, the angle of arrival (AoA) or angle of departure (AoD) may be detected at each of the nodes 350-1, 350-2 and 350-3 using multiple receiving antennas in order to better define a location of the information handling system 300 within the area the LTE nodes 350-1, 350-2 and 350-3 have been deployed.

In an embodiment, the nodes 350-1, 350-2 and 350-3 may be Bluetooth-enabled beacons that communicate with the information handling system 300 using a Bluetooth (BT) communication protocol. In this embodiment, the BT-enabled nodes 350-1, 350-2 and 350-3 may each include a receiving antenna array that detects the RF signal strength from the information handling system 300 as well as the AoA of the signal emitted from the information handling system 300. With this information, the information handling system 300 may be presented with data descriptive of the location of the information handling system 300 within the area that the BT-enabled nodes 350-1, 350-2 and 350-3 have been deployed.

In an embodiment, the nodes 350-1, 350-2 and 350-3 may be Wi-Fi beacons that communicate with the information handling system 300 that uses a received signal strength indicator (RSSI) localization process to measure a signal strength between the information handling system 300 and the nodes 350-1, 350-2 and 350-3. In this embodiment, the Wi-Fi beacons may also detect the AoA of the incoming RF signals from the information handling system 300 and report to the other Wi-Fi beacons the detected AoA of the RF signal. With this information and the signal strength data received, one or more of the Wi-Fi beacons may report to the information handling system 300 its location within the are the Wi-Fi beacons are deployed.

It is understood that with any type of nodes 350-1, 350-2 and 350-3 described herein, the data obtained by each of the nodes 350-1, 350-2 and 350-3 may be shared amongst the nodes and provided to the information handling system 300 as well. In an embodiment, one or more of the nodes 350-1, 350-2 and 350-3 may execute computer-readable program code to perform any computation related to determining, via triangulation, the location of the information handling system 300 within the area the mesh network of nodes 350-1, 350-2 and 350-3 is deployed. In an embodiment, the signal strength data (e.g., RSSI) and AoA data may be relayed to the triangulation module 126 for the triangulation module 126 and processor of the information handling system 300 to compute the location of the information handling system 300 within the mesh network the nodes 350-1, 350-2 and 350-3 reside. This computation may include the execution of instructions, parameters, and profiles 324 maintained on the computer readable medium 322 as described herein.

In an embodiment, the nodes 350-1, 350-2 and 350-3 of the mesh network may be communicatively coupled to at least one 5G access point 360. As a result of this communication between the nodes 350-1, 350-2 and 350-3 and the 5G access point 360, the nodes 350-1, 350-2 and 350-3 may know the physical location of the 5G access point 360 relative to the nodes 350-1, 350-2 and 350-3 themselves and, thus, the location of the information handling system 300 relative to the 5G access point 360. With this data, the triangulation module 126 may provide this relative location data to the beamsteering module 318. During operation, the beamsteering module 318 may receive the location data as described herein, and, through execution of instructions, parameters, and profiles 324 maintained on the computer readable medium 322, may conduct beamsweeping of a plurality of angles for a mm-wave antenna array 370 using the angle data from the nodes 350-1, 350-2 and 350-3 as an initial seed angle for the beamsweeping.

Because there may be multiple 5G access points 360 available for 5G communication with the information handling system 300, the angle data provided to the beamsteering module 318 may cause the beamsteering module 318 to execute the instruction, parameter, and profiles 324 that cause the mm-wave antenna array 370 to direct its main lobe 380 towards more than one 5G access point 360 during this beamsweeping process so that the information handling system 300 may secure the most reliable connection with a 5G access point 360 as possible. However, because the angle data was provided to the beamsteering module 318 by the triangulation module 126 after the triangulation process, the number of angles that the main lobe 380 is directed at is significantly reduced thereby reducing the processing power and time taken to sweep all angles from the information handling system 300. The beamsweeping process may be time and resource consuming, and, thus, utilization of the triangulation module 126 and triangulation process at between the triangulation module 126 and nodes 350-1, 350-2 and 350-3 can provide calculation of angles 382 and distance data for one or more 5G access points 360. This angle data may be used as the initial seed angles for the beamsweeping process to measure and select a beamsteering pattern angle between the information handling system 300 and the 5G access point 360. With the initial seed angle, other angular zones may be spot checked for measurements of signal quality as compared to a zone with the initial seed angle to assist in elimination of beamsteering pattern angles. This may significantly expedite the beamsweeping process in embodiments herein.

Figure 4:
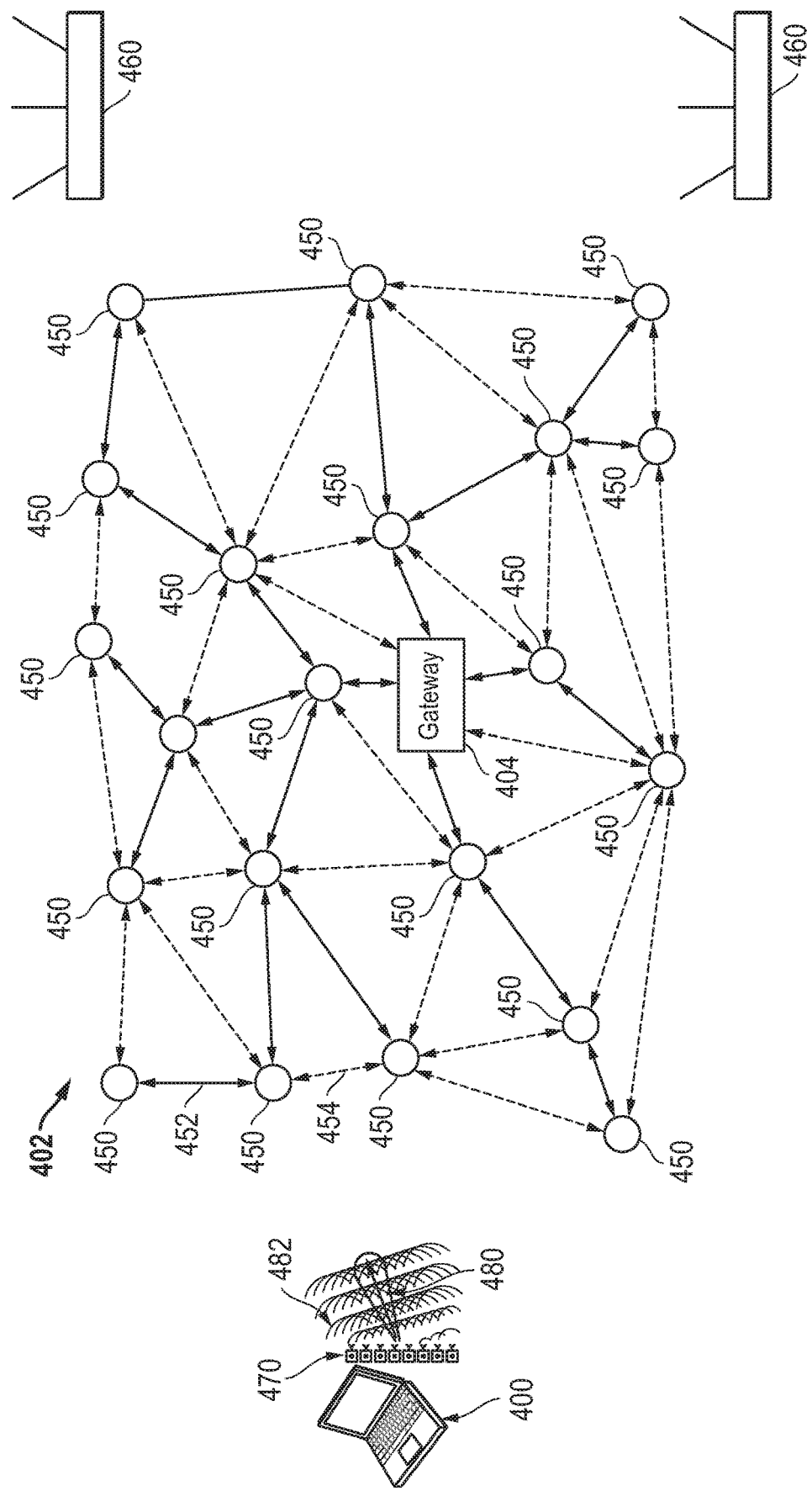
FIG. 4 is a diagram illustrating a wireless mesh network of nodes according to an embodiment of the present disclosure.

FIG. 4 is a diagram illustrating a wireless mesh network 402 of nodes 450 according to an embodiment of the present disclosure. The wireless mesh network 402 may be communicatively coupled to an information handling system 100 similar to the information handling systems described in connection with FIGS. 1 and 3 herein. The wireless mesh network 402 may also be communicative coupled to a 5G access point 460 and may know the location of the 5G access points 460 relative to any of the nodes 450 within the wireless mesh network 402.

The wireless mesh network 402 may be made of any number of nodes 450 that each are operatively and communicatively coupled to each other. In an embodiment, any one of the nodes 450 may have a primary communication route 452 and a secondary communication route 454. The primary communication route 452 (e.g., solid arrows between nodes 450) may be that route that any specific node 450 uses as its initial route to transmit data among the nodes within the wireless mesh network 402. Any secondary communication route 454 may be used by any given node 450 within the wireless mesh network 402 as a route to transmit data when communication with a node 450 via a primary communication route 452 is not available. Consequently, the wireless mesh network 402 allows for multiple communication routes among the nodes 450 so that data may be transferred throughout the wireless mesh network 402 even when any specific node 450 is no longer communicatively coupled or present. In an example where the nodes 450 are internet-of-things (IoT) nodes, any given node 450 may be removed from the wireless mesh network 402 without affecting the communication abilities of the wireless mesh network 402 as a whole. This may be especially desirable where the nodes 450 each provide distance and angle data to a triangulation module and/or beamsteering module of the information handling system 400 in order to determine at which angles 482 a mm-wave antenna array 470 is to direct the main lobe 480 of a mm-wave RF transmission in order to communicate with one or more 5G access points 460.

In an embodiment, the wireless mesh network 402 may include a gateway 404. The gateway 404 may be any device that allows for the wireless mesh network 402 to communicate to other networks remote to the wireless mesh network 402. In an embodiment, the gateway 404 may be communicatively coupled to one or more 5G access points 460. By being communicatively coupled to the 5G access point 460, the gateway 404 may receive data descriptive of the physical location of the 5G access points 460 to which the information handling system 400 may be communicatively coupled to.

As described herein, the nodes 450 may be any type of device communicating at any type of frequency or communication protocol. These may include Wi-Fi beacons, Bluetooth-enabled beacons, and LTE nodes, among other types of nodes. In an embodiment, the wireless mesh network 402 may include various different types of nodes 450 that may each be communicatively coupled to each other. In this embodiment, the wireless mesh network 402 may include a set of LTE 4G nodes 450 or GPS-enabled nodes 450 that provide triangulation data to the information handling system 400 while the information handling system 400 is present outside of a building. In this embodiment, as the information handling system 400 is moved into the building, the LTE 4G nodes 450 may pass communication and location data onto a gateway 404 that directs Wi-Fi beacon nodes 450 or BT-enabled nodes 450 to initiate communication with the information handling system 400 and begin the triangulation processes as described herein.

Figure 5:
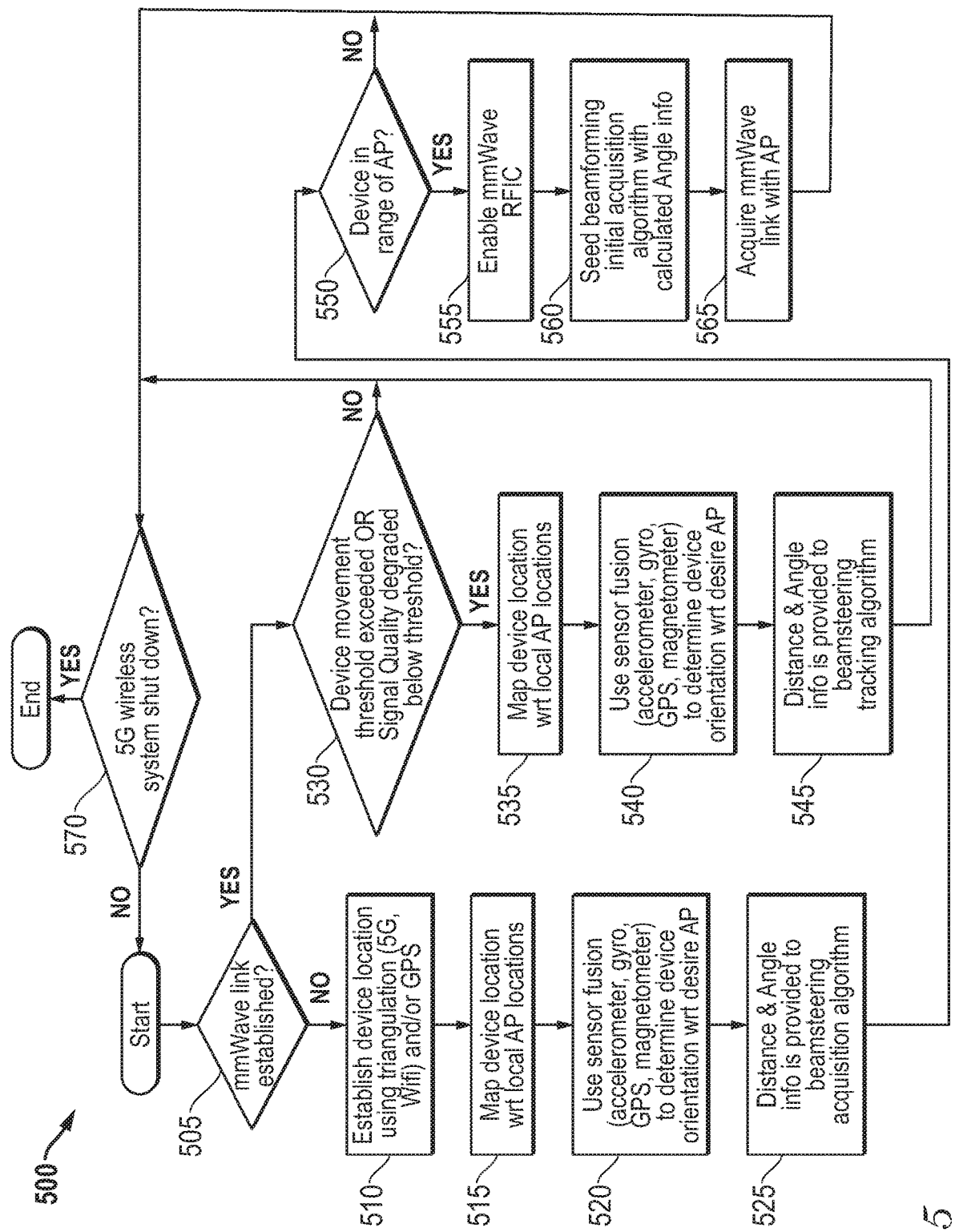
FIG. 5 is a flow diagram illustrating a method of establishing a millimeter-wave connection with a 5G access point at an information handling system using triangulation according to an embodiment of the present disclosure.

FIG. 5 is a flow diagram illustrating a method 500 of establishing a millimeter-wave connection with a 5G access point at an information handling system according to an embodiment of the present disclosure. The method 500 may include determining, at block 505, whether a mm-wave link or communication has been established by the information handling system to a 5G access point. The establishment of the mm-wave link by the information handling system to the 5G access point may be accomplished using any of the arrays of mm-wave antennas at the information handling system as described herein.

Where a mm-wave link has been established between the information handling system and the 5G access point, YES decision at block 505, a determination may be made at block 530 relative to movement or change in angle between the information handling system and 5G access point as to whether the information handling system has moved beyond a threshold distance from an 5G access point and/or whether a signal quality from the 5G access point and detected by the information handling system has degraded below a threshold level.

Where the information handling system has not been moved past the threshold distance and the signal quality has not degraded past the threshold, NO determination at block 530 may allow the method to continue to block 570 to determine if the 5G mm-wave radio system is shut down or simply unavailable in some embodiments. If the 5G mm-wave radio is shut down or unavailable according to any triggers as described in various embodiments herein, the method may end. If, however, at block 570, the mm-wave 5G radio is intended to continue operating then the method 500 may continue to iteratively make the decisions at block 505 and 530 and monitor or track location and signal levels until the status of the information handling system has changed. In an embodiment, the decisions made at block 530 may be conducted using a mm-wave antenna array to determine the location of the information handling system relative to the 5G access point as described herein. The signal quality threshold may be assessed by detecting >6 GHz mm-wave antenna array operations as monitored and detected during operation of the mm-wave connection. For example, a baseband processor may monitor signal to noise ratios, bit error rates, interference levels, received signal strength, or other metrics relating to signal quality during operation.

Where the information handling system has been moved past the threshold distance, past a threshold change in angle deviation, or the signal quality has degraded past the threshold (YES determination at block 530) the method 500 may continue, at block 535, with the information handling system sending or acquiring signals from a plurality of nodes within a mesh network in order to determine a location of the information handling system relative to the nodes via a triangulation process described herein. Sufficient changes in angle between the information handling system and the 5G access point may require a readjustment to the existing beamsteering pattern operating for continuing mm-wave communications. As described herein, the information handling system alternatively may be sufficiently far away from one 5G access point to prompt the information handling system to acquire a new mm-wave link with another new 5G access point for continued mm-wave communications. When either situation occurs, the protocols associated with the acquisition of triangulation data may be used to determine data descriptive of the placement and angle of the information handling system relative to each of the nodes or a plurality of nodes within the mesh network.

At block 540, the method 500 may include acquiring data from position sensor data that may include sensors such as an accelerometer, a gyroscope, a GPS system, and/or a magnetometer within the information handling system in order to determine the orientation, position, or configuration of the information handling system. The data from these sensors may be fused or otherwise accumulated together in order to determine the orientation and position of the information handling system, or more particularly in some embodiments the position of the mm-wave 5G antenna array, relative to the 5G access points.

The method 500 may include, at block 545, providing distance and angle data to a beamsteering module that calculates an adjusted beamsteering pattern from the information handling system to the 5G access point to track ongoing mm-wave communication with the 5G access point. In an embodiment, this process may include calculating an angle of the information handling system relative to the 5G access point based on the triangulation data received from the plurality of nodes. In a particular embodiment, the position and orientation data from position sensors may provide the relative orientation of one or more 5G mm-wave antenna arrays, such as planar orientation, on an information handling system relative to a 5G access point. As described herein, the triangulation data is descriptive of a relative location of the nodes to the information handling system and, accordingly, the relative location of the information handling system relative to the 5G access point. This triangulation data may be presented to the information handling system from the nodes in the form of distance data, time of flight (ToF data), signal degradation levels data relating to distance, and angle data such as angle of attack (AoA) or angle of departure (AoD) data, among others described herein.

The beamsteering module may implement any process, method, or algorithm in order to cause the RF EM waves emitted by the mm-wave antenna array to be redirected and adjusted to the 5G access point for the mm-wave communication link. If the detected angle change causes less than a loss of signal in some embodiments, the beamsteering module may adjust the directionality of the main lobe of transmission for a mm-wave antenna array to be better directed toward a 5G access point with which communication are occurring. Such changes may be detected via position sensor detecting some angle changes and providing for tracking beamsteering to accommodate such changes. In an embodiment, the mm-wave link between the information handling system and 5G access point may continue with direction adjustments. The method 500 may continue to block 570 to determine if the 5G mm-wave radio system is shut down or simply unavailable in some embodiments. If the 5G mm-wave radio is shut down or unavailable according to any triggers as described in various embodiments herein, the method may end. If, however, at block 570, the mm-wave 5G radio is intended to continue, the method 500 may return back at block 505 with iteratively determining whether a mm-wave link has been established or is maintained between the information handling system and 5G access point for periodic or iterative beamsteering tracking.

Where a mm-wave link has not been established between the information handling system and the 5G access points, a NO decision at block 505, the method 500 may proceed to block 510 to establish the location of the information handling system using the triangulation techniques and process described below and elsewhere herein. In doing so, the method 500 may continue, at block 515, with the information handling system sending or acquiring signals from a plurality of nodes within a mesh network in order to determine a location of the information handling system relative to the nodes via a triangulation process described herein. Sufficient changes in angle between the information handling system and the 5G access point relative to the current or default direction of the mm-wave antenna array and may require a readjustment of the existing beamsteering pattern operating to establish mm-wave communications. As described herein in some embodiments, the information handling system alternatively may be sufficiently far away from one 5G access point to prompt the information handling system to acquire a new mm-wave link with another new 5G access point in a hand-over process for continued mm-wave communications. When either situation occurs, the protocols associated with the acquisition of triangulation data may be used to determine data descriptive of the placement and angle of the information handling system relative to each of the nodes or a plurality of nodes within the mesh network. This triangulation data also determines data descriptive of the placement and angle of the information handling system relative to known positions of 5G access points that may be candidates for 5G mm-wave wireless communications.

At block 520, the method 500 may include acquiring data from an accelerometer, a gyroscope, a GPS system, and/or a magnetometer within the information handling system in order to determine the orientation of the information handling system. In particular, the orientation of a configuration of the endpoint information handling system, such as a laptop information handling system or dual screen device, may alter the position of one or more 5G mm-wave antenna arrays. The data from these sensors may be fused or otherwise accumulated together in order to determine the orientation of the information handling system, or surfaces or edges of the same where mm-wave antenna arrays are positioned, relative to the 5G access points. For example, orientation of a plane of the mm-wave antenna array may be atop, on sides, along edges, or on the back of a display chassis of a laptop information handling system, tablet or smartphone device, or a dual-display device in some embodiments. In other embodiments, one or more mm-wave antenna arrays may have a plane of orientation located under a C-cover of a base chassis, along a hinge, or along an edge of a base chassis for an information handling system such as a laptop device. The information handling system maybe reconfigurable with respect to base and display chassis or multiple display chasses as well, thus orientation of the plane of one or more 5G mm-wave antenna arrays may change and affect the angular data of the information handling system relative to one or more available 5G access points. The position and orientation sensor data may be used in various embodiments to refine the triangulation data, which may be a rougher estimation of location, position, or orientation, to yield refined angle and distance data of a 5G mm-wave antenna array and its position relative to 5G access points.

The method 500 may include, at block 525, providing distance and angle data to a beamsteering module that calculates an adjusted beamsteering pattern from the information handling system to the 5G access point for a sufficient or optimal directionality for mm-wave communication with any available 5G access point. In an embodiment, this process may include calculating an angle of the information handling system relative to the 5G access point based on the triangulation data received from the plurality of nodes. As described herein, the triangulation data is descriptive of a relative location of the nodes to the information handling system and, accordingly, the relative location of the information handling system relative to the 5G access point. This triangulation data may be presented to the information handling system from the nodes in the form of distance data ToF data, and AoA data, among others described herein.

The method 500 may continue, at block 550, with a decision as to whether the information handling system is within range of the 5G access points. Where it is determined that the information handling system is not within range of the 5G access point (a NO decision at block 550), the method 500 may continue to block 570 to determine if the 5G mm-wave radio system is shut down or simply unavailable in some embodiments. If the 5G mm-wave radio is shut down or unavailable according to any triggers as described in various embodiments herein, the method may end. If, however, at block 570, the mm-wave 5G radio is intended to continue, the method 500 may return back at block 505 with iteratively determining whether a mm-wave link has been established or is maintained between the information handling system and 5G access point for periodic or iterative beamsteering tracking. Where the distance is determined to not be in range, the information handling system at 505 may conduct a search for another potential 5G access points as a candidate for communications. The search for and establishment of the mm-wave link by the information handling system to the 5G access point may be accomplished using any of the arrays of mm-wave antennas at the information handling system as described herein.

Where it is determined that the information handling system is within range of the 5G access point (YES decision at block 550), the method 500 may continue at block 555 with enabling the mm-wave RF IC described herein to conduct a beamsweeping process to check and measure multiple node angles for directionality of the 5G mm-wave antenna arrays. Proceeding to block 560, the beamforming process used may adopt the relative angle determined by the triangulation module between the information handling system and the 5G access point as an initial seed angle for the beamsweeping process phase in assessing plural antenna array node angles in the mm-wave spectrum. This initial beamforming algorithm for conducting a beamsweeping may operate to iteratively assess node angles in various zones and compare those spot-checked angles with the initial seed angle zone to find a suitable beamsteering pattern. With the initial seed angle, zones of node angles may be eliminated by comparison thus potentially reducing several among thousands of potential node angles to be scanned in a beamsweeping algorithm.

The beamsteering process may use the initial seed angle to simplify the scan and measurement of signal quality at a plurality of node angles as compared to the node at an initial seed angle. In other embodiments, the initial seed angle may provide a direction in which to begin a beamsweeping process such that opposite directions may not need to be checked when a beamsteering pattern with sufficient signal quality is discovered. According to the above, the beamsteering module may select a beamsteering node pattern with an optimizes signal quality level or one that meets a signal quality threshold level. The beamsteering module may send the selected beamsteering pattern to a selected 5G access point for determination of a reciprocal angle of a beamsteering pattern to be utilized there to maximize the directionality for 5G mm-wave communication reliability and efficiency. The method 500 may then proceed to block 565 with acquiring the mm-wave link between the information handling system and the 5G access points.

The method 500 is described herein from the perspective of the information handling system. For example, the information handling system may make the decisions at blocks 505, 530, and 550 as well as make the calculations at blocks 520, 525, 540, 545 by executing computer readable program code maintained on the memory devices of the information handling system. The information handling system may also execute a beamsteering module to implement a mm-wave connection as described in blocks 555, 560 and 565 in some embodiments. Other embodiments may also include sending any angle data, distance data, and triangulation data to the 5G access point to direct the array of mm-wave antennas of the 5G access point toward the information handling system or vice-versa during any beam sweeping phase engage in by the beamforming process at either the information handling system or the 5G access point.

In alternative embodiments, the 5G access point may make these decisions and execute this computer readable program code so as to establish a mm-wave link from the 5G access point to the information handling system via execution of both a triangulation module and beamsteering module at the 5G access point or a central management system interfacing with several 5G access points and other network options such as the mesh networks described in embodiments herein. In some alternative embodiments, the 5G access point may conduct a triangulation assessment via a triangulation module executing at the 5G access point or a central management system to determine angle and distance data for use in assessing initial seed angles for beamforming initiation processes which may be conducted at an endpoint information handling system. In other alternative embodiments, the 5G access point or a central management system may conduct a beamsteering selection of a beamsteering pattern using an initial seed angle or distances derived via a triangulation module executing at the endpoint information handling system. As such, the present disclosure contemplates that the processes, methods, and algorithms used to establish the mm-wave link between the information handling system and 5G access point may be conducted by any information handling system, including the endpoint information handling system, the 5G access point with a processing device included, other remote information handling systems, or some combination.

Figure 6:
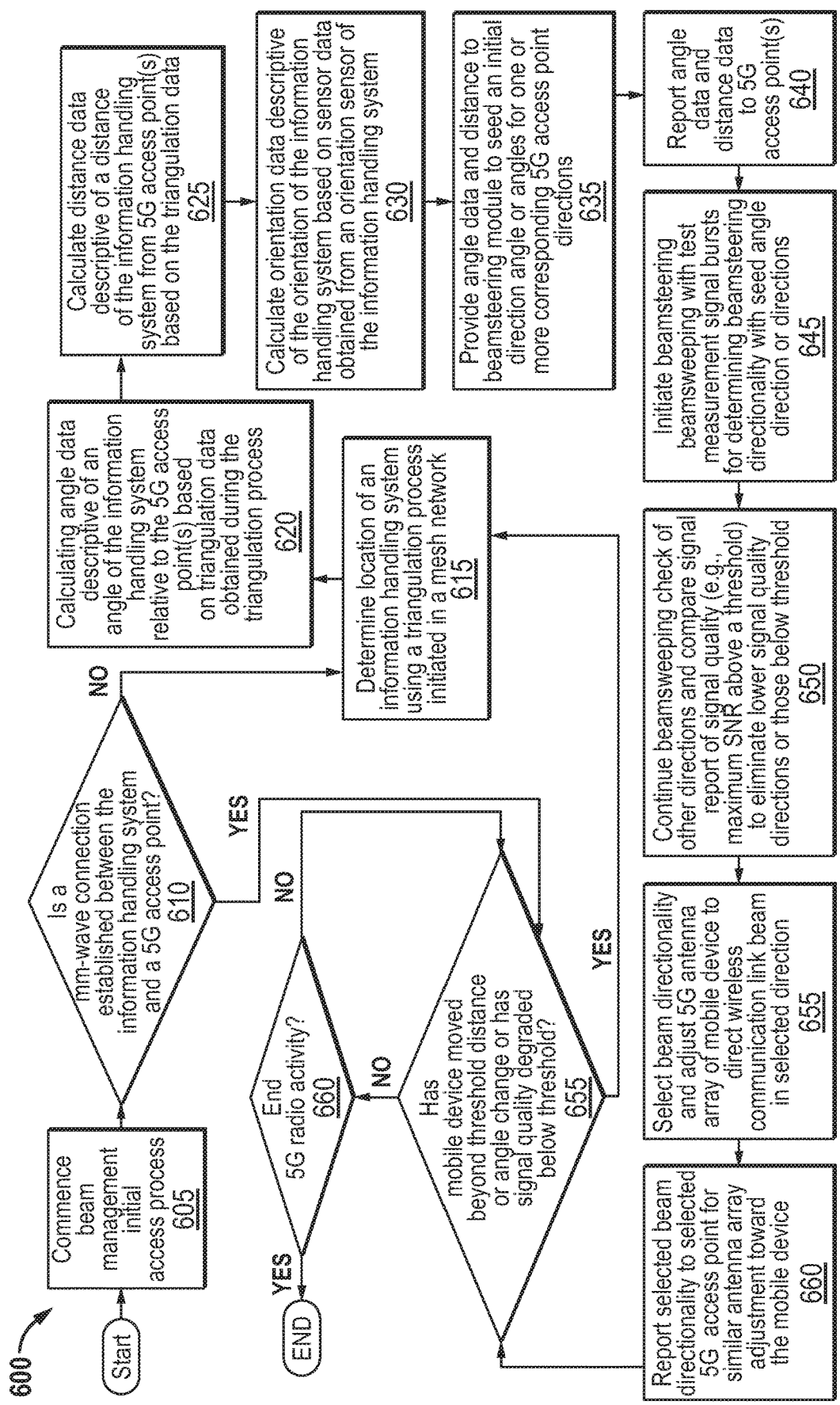
FIG. 6 is a flow diagram illustrating a method of establishing a millimeter-wave connection with a 5G access point of a plurality of potential 5G access points at an information handling system using triangulation according to an embodiment of the present disclosure.

FIG. 6 is a flow diagram illustrating a method 600 of establishing a millimeter-wave connection with a 5G access point among a plurality of possible 5G access points at an information handling system according to an embodiment of the present disclosure. The method 600 may include, at block 605 with commencing with a beam management initial access process. This process may include, in an embodiment, with determining at block 610 whether a mm-wave connection has been established between the information handling system and a 5G access point. Where a mm-wave connection is established between the information handling system and a 5G access point (YES determination at block 610), the method 600 may proceed to block 655 to conduct beamsteering tracking of the position of the endpoint information handling system via the position and orientation sensors which may indicate motion or changes in position, orientation or configuration. Further the beamforming tracking at block 655 may assess the triangulation, mesh network tracking, or other location detection system to determine changes in location or orientation. Block 655 also conducts the beamsteering tracking to determine whether the information handling system has moved beyond a threshold distance, whether the angle such as AoA (or AoD) has changed, or whether the signal quality between the 5G access point and the information handling system has degraded below a threshold during the ongoing or iterative beamsteering tracking. Because the information handling system may be mobile and may be transported into and out of a plurality of signal areas of a plurality of 5G access points, the signal quality may change due to changes in the AoA/AoD angle data, and or distance of the information handling system relative to the 5G access points.

As described, the method 600 may also include, at block 615 with determining with determine a location of an information handling system using a triangulation process initiated in a mesh network as described herein. As such, this determination at block 615 may include calculating angle data descriptive of an angle of the information handling system relative to any available 5G access points that may be within a distance range of the detected location of the endpoint information handling systems. Example 5G distance ranges may include determinations of whether the 5G access point is inside or outside or the frequency band of communications which may affect the range of 5G communications. For an outside, lower band mm-wave transmission, distances may be determined to be candidate 5G access points within 100 or 200 meters depending on factors described. For an indoor, higher frequency band mm-wave transmission, the distances may be candidate 5G access points within 10 or 15 meters. The system describe in embodiments of the present disclosure may select those that fall within a range based on mm-wave frequency band to be used and, in some cases, the power levels available for communications indoors versus outdoors. The distance determination of available 5G access points may be made based on triangulation data obtained during the triangulation process as indicated at block 620. With this process, distance data descriptive of a distance of the information handling system from any available 5G access points based on the triangulation data may be calculated at block 625.

The method 600 may also include, at block 630, calculating orientation data descriptive of the orientation of the information handling system based on sensor data obtained from an orientation sensor of the information handling system. This process at block 630 may include acquiring data from an accelerometer, a gyroscope, a GPS system, and/or a magnetometer within the information handling system in order to determine the orientation of the information handling system. The data from these sensors may be fused or otherwise accumulated together in order to determine the orientation of the information handling system relative to the 5G access points.

The method 600, at block 635, may also include providing the distance and the angle data to a beamsteering module of the information handling system to seed an initial direction angle or angles for one or more corresponding 5G access point directions. In an embodiment, the information handling system may execute any process or algorithm that causes the main lobes of the radiation patterns produced by a mm-wave antenna or array of mm-antennas of the information handling system to be altered to point towards one of many determined locations of 5G access points. Once a direction towards the one or more available 5G access points has been discovered, the information handling system may transmit the angle data and distance data to any or all of the detected 5G access points so that a mm-wave antenna or array of mm-wave antennas at the 5G access point may also engage in the beamsteering process previously conducted at the information handling system.

The method 600 may continue with, at block 640, reporting the angle data and distance data relevant to each of the available 5G access points. As described herein, the beamforming processes executed to the information handling system may also be executed at each of the 5G access points so that their RF signals may also be formed such that the main lobe of the RF pattern may be directed towards the information handling system. With the relative angle data, the 5G access points may be steered toward the endpoint information handling system in some embodiments during the beamsweeping process to assess signal quality levels of various angular node directions for beamsteering patterns being measured during beamsweeping.

The method 600 may also include, at block 645, initiating a beamsteering beamsweeping with test measurement signal bursts for determining beamsteering directionality starting with the initial seed angle direction or directions. The beamsweeping process as described may potentially measure signal levels at thousands of possible node angles for a 5G mm-wave antenna array. The beamsweeping process may be made more efficient with one or more initial seed angles and distance data provided for the one or more available 5G access points for the endpoint information handling system. The beamsweeping process may check angles in zones from the mm-wave antenna array against directions determined via the triangulation or other techniques described to determine the initial seed angle or angles. By spot checking one or more angles from some zones of angles not having a seed angle relative to seed angle zones, some zones may be eliminated quickly in an example embodiment.

The beamsteering beamsweeping process may include, at block 650, continuing to check other directions where 5G access point locations have been detected and comparing signal reports related to the signal quality (e.g., maximum SNR above a threshold) between the information handling system and 5G access points in order to eliminate lower signal quality directions or those directions that have a signal quality below a threshold. This process ensures that the most reliable connection between the information handling system and a 5G access point is achieved. By selecting the most reliable connection between the information handling system and a 5G access point, the relatively shorter mm-wave frequencies produced by the mm-wave antennas may reach the information handling system or 5G access point during packet transmissions. In some embodiments, the endpoint information handling system may utilize the above methods to select plural 5G access points and beamsteering patterns for communications with those plural 5G access points.

The method 600 may continue at block 655 with selecting the beam directionality having the most reliable connection and adjusting the 5G mm-wave antenna array within information handling system to direct the wireless communication link beam in the selected direction towards the selected 5G access point (or 5G access points) as a selected beamsteering pattern of the 5G mm-wave antenna array. Similarly, the information handling system, at block 660, may report the selected beam directionally to the selected 5G access point (or 5G access points) so that the 5G antenna arrays at the 5G access point (or 5G access points) may be adjusted to point toward the information handling system in a reciprocal beamsteering pattern. This ensures that the best 5G communication may occur between the information handling system and the 5G access point.

The method 600 continues at block 655 with deciding whether the information handling system has moved beyond a threshold distance, whether the AoA (or AoD) has changed, or whether the signal quality between the 5G access point and the information handling system has degraded below a threshold during ongoing or iterative beamsteering tracking. Because the information handling system may be mobile and may be transported into and out of a plurality of signal areas of a plurality of 5G access points, the signal quality may change due to changes in the AoA/AoD angle data, and or distance of the information handling system relative to the 5G access points.

Where it is determined that, YES at block 655, the information handling system has moved beyond a threshold distance, the angle such as AoA or AoD has changed, or the signal quality between the 5G access point and the information handling system has degraded below a threshold, the method 600 may proceed again at block 615 with determining with determine a location of an information handling system using a triangulation process, or a triangulation process initiated in a mesh network as described herein.

Where it is determined that, NO at block 655, the information handling system has not moved beyond a threshold distance, the angle such as AoA or AoD has not changed, or the signal quality between the 5G access point and the information handling system has not degraded below a threshold, the method 600 continues with determining whether the 5G radio activity is to end at block 660. Where the 5G communication is to be maintained by the information handling system (NO determination at block 660), the method 600 may iteratively determine whether the information handling system has moved beyond a threshold distance, the AoA or AoD has changed, or the signal quality between the 5G access point and the information handling system has degraded below a threshold by returning to decision block 655. Where the 5G communication is not to be maintained by the information handling system (YES determination at block 660), the method 600 may end. In an embodiment, any number of triggering events may allow the information handling system to determine that the 5G communication is not to be maintained by the information handling system. These triggering events may include shutting down of the information handling system, turning off of the mm-wave antennas, and power loss to the information handling system, among others.

The blocks of the flow diagrams of FIGS. 5 and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system, comprising:
a processor;
a memory;
a wireless adapter to determine whether a millimeter-wave (mm-wave) connection is established between the information handling system and a candidate 5G access point and
the wireless adapter to utilize the mm-wave connection established with the candidate 5G access point when detected;
a triangulation module to, when the wireless adapter detects no established mm-wave connection between the information handling system and any 5G access point:
 determine the location of the information handling system using a triangulation process initiated within a mesh network having a plurality of nodes before conducting beamsweeping;
 calculate angle data descriptive of an angle of the information handling system relative to the candidate 5G access point based on triangulation data obtained during the triangulation process;
 calculate distance data descriptive of a distance of the information handling system from the candidate 5G access point based on the triangulation data; and
 calculate orientation data descriptive of the orientation of the information handling system based on sensor data obtained from an orientation sensor of the information handling system; and
a beamsteering module to:
 conduct a beamsweeping operation of a plurality of angles for a mm-wave antenna array using the angle data as an initial seed angle toward the candidate 5G access point to reduce processing for the beamsweeping operation by selecting
 a beamsteering pattern from the information handling system to the candidate 5G access point to initiate the mm-wave communication with the candidate 5G access point based on signal quality above a threshold level;

cease the beamsweeping operation when the signal quality between the information handling system and the candidate 5G access point exceeds the threshold level; and select the candidate 5G access point and utilize the selected beamsteering pattern for mm-wave communication when the signal quality exceeds the threshold level.

2. The information handling system of claim 1, wherein the information handling system further sends the distance data and angle data to the candidate 5G access point to allow the candidate 5G access point to steer the candidate 5G access point beamsteering pattern toward the information handling system during the beamsweeping operation.

3. The information handling system of claim 1, wherein the information handling system sends the selected beamsteering pattern to the selected candidate 5G access point to allow the selected candidate 5G access point to select a reciprocal beamsteering pattern from the selected candidate 5G access point to the information handling system to initiate mm-wave communication between the selected candidate 5G access point and the information handling system.

4. The information handling system of claim 1, wherein, when the wireless adapter determines a mm-wave connection has been established between the information handling system and the 5G access point, the wireless adapter iteratively determines:

whether the information handling system is moving or whether a signal quality of the mm-wave connection has degraded below a second threshold level; and where it is determined that either the information handling system is moving or the signal quality of the mm-wave connection has degraded below the second threshold, the triangulation recalculates angle data descriptive of the angle of the information handling system relative to the 5G access point and recalculates distance data descriptive of the distance of the information handling system from the 5G access point.

5. The information handling system of claim 4, further comprising, at the beamsteering module receiving the recalculated angle data and recalculated distance data from the triangulation module and selecting an adjusted beamsteering pattern from the information handling system to the 5G access points to continue the mm-wave communication with the 5G access point.

6. The information handling system of claim 1, wherein the triangulation process initiated within a mesh network is a Wi-Fi triangulation process.

7. The information handling system of claim 1, wherein the wireless adapter is communicatively coupled to an array of sub-six GHz antennas to initially establish a Bluetooth (BT) connection with one of the plurality of nodes within the mesh network.

8. The information handling system of claim 1, wherein the triangulation process initiated within a mesh network includes initially detecting the position of the information handling system using a global positioning satellite (GPS) system to detect approximate location data descriptive of an approximate location of the information handling system and, with the approximate location data, detecting an initial position of the information handling system within the mesh network.

9. A method of establishing a millimeter-wave connection with a 5G access point at an information handling system, comprising:

determining, via a wireless adapter, whether a millimeter-wave (mm-wave) connection is established between the information handling system and a candidate 5G access point;

with a triangulation module executed by a processor, determining the location of the information handling system using a triangulation process initiated within a mesh network having a plurality of nodes;

calculating angle data descriptive of an angle of the information handling system relative to the candidate 5G access point based on triangulation data obtained during the triangulation process; and calculating distance data descriptive of a distance of the information handling system from the candidate 5G access point based on the triangulation data;

calculating orientation data descriptive of the orientation of the information handling system based on sensor data obtained from an orientation sensor of the information handling system;

conducting a beamsweeping operation of a plurality of beamsteering angles via the beamsteering module for a mm-wave antenna array on the information handling system and beginning with the angle of the information handling system relative to the candidate 5G access point as an initial seed angle toward the candidate 5G access point to reduce processing for beamsweeping;

selecting a beamsteering pattern and ceasing the beamsweeping operation from the information handling system to the candidate 5G access point when a signal quality above a first threshold is determined;

initiating mm-wave communication with the selected candidate 5G access point; and establishing the mm-wave connection, via a wireless adapter, between the information handling system and the selected candidate 5G access point using the selected beamsteering pattern.

10. The method of claim 9, further comprising sending the selected beamsteering pattern to the selected candidate 5G access point to allow the selected candidate 5G access point to calculate a reciprocal beamsteering pattern from the selected candidate 5G access point to the information handling system to establish the mm-wave connection.

11. The method of claim 9, further comprising, when the wireless adapter determines a mm-wave connection has been established between the information handling system and the candidate 5G access point, iteratively determining:

whether the information handling system is moving or whether a signal quality of the mm-wave connection has degraded below a threshold; and where it is determined that either the information handling system is moving or the signal quality of the mm-wave connection has degraded below a threshold, recalculating the angle data descriptive of the angle of the information handling system relative to the candidate 5G access point and recalculating distance data descriptive of the distance of the information handling system from the candidate 5G access point.

12. The method of claim 11, further comprising, at the beamsteering module, receiving the recalculated angle data and recalculated distance data and calculating an adjusted beamsteering pattern from the information handling system to the candidate 5G access point to continue the mm-wave communication with the candidate 5G access point.

13. The method of claim 9, further comprising determining that the information handling system is within range of the candidate 5G access point for mm-wave communication using the calculated distance data.

14. The method of claim 9, wherein the triangulation process initiated within a mesh network further includes initially detecting the position of the information handling system using a global positioning satellite (GPS) system to detect approximate location data descriptive of an approximate location of the information handling system and, with the approximate location data, detecting an initial position of the information handling system within the mesh network.

15. An information handling system, comprising:
   a processor;
   a memory;
   a wireless adapter to determine whether a millimeter-wave (mm-wave) connection is established between the information handling system and a candidate 5G access point;
   a global positioning satellite (GPS) module to determine approximate location data descriptive of an approximate location of the information handling system;
   a Wi-Fi triangulation module to, when the wireless adapter determines that no mm-wave connection between the information handling system and the candidate 5G access point is established:
      determine the location of the information handling system using a triangulation process to acquire triangulation data within a mesh network having a plurality of nodes using the approximate location as an initial location point within the mesh network;
      calculate angle data descriptive of an angle of the information handling system relative to the candidate 5G access point based on triangulation data obtained during the triangulation process; and
      calculate distance data descriptive of a distance of the information handling system from candidate 5G access point based on the triangulation data;
      calculate orientation data descriptive of the orientation of the information handling system based on sensor data obtained from an orientation sensor of the information handling system; and
   a beamsteering module to:
      selected a beamsteering pattern with the candidate 5G access point based on a limited beamsweeping operation using the angle of the information handling system relative to the candidate 5G access point to conduct the beamsweeping operation and ceasing the beamsweeping operation based on signal quality determined above a first threshold level to reduce processing of the beamsweeping operation; and
      determining a reciprocal beamsteering patterns between the candidate 5G access point and the information handling system for a mm-wave antenna array select the candidate 5G access point and to initiate a mm-wave communication with the selected candidate 5G access point.

16. The information handling system of claim 15, wherein the information handling system further receives distance from the candidate 5G access point to determine whether the information handling system is within range of the candidate 5G access point to enable the mm-wave communication between the information handling system and candidate 5G access point using the reciprocal beamsteering pattern.

17. The information handling system of claim 15, wherein the information handling system receives angle data descriptive of the angle of the candidate 5G access point relative to the information handling system from the candidate 5G access point to direct an initial reciprocal beamsteering pattern from the information handling system toward candidate 5G access point for the beamsweeping operation at the candidate 5G access point.

18. The information handling system of claim 15, further comprising:
   the Wi-Fi triangulation module configured to iteratively determines whether the information handling system is moving or whether a signal quality of the mm-wave connection has degraded below a second threshold level; and
   where it is determined that either the information handling system is moving or the signal quality of the mm-wave connection has degraded below the second threshold, the Wi-Fi triangulation module configured to receives a reselected beamsteering pattern from the selected candidate 5G access point based on recalculated angle data descriptive of the angle of the information handling system relative to the selected candidate 5G access point and recalculated distance data descriptive of a distance of the information handling system from the selected candidate 5G access point.

19. The information handling system of claim 18, wherein the received reselected beamsteering pattern from the selected candidate 5G access point is used to determine an adjusted reciprocal beamsteering pattern from the information handling system to the selected candidate 5G access point to continue the mm-wave communication with the selected candidate 5G access point.

20. The information handling system of claim 15, wherein the wireless adapter is communicatively coupled an array of mm-wave antennas to select directionality of a mm-wave connection with the selected candidate 5G access point via the reciprocal beamsteering pattern.

\* \* \* \* \*